(12) United States Patent
Ernst et al.

(10) Patent No.: US 6,975,428 B1
(45) Date of Patent: Dec. 13, 2005

(54) METHOD, SYSTEM, AND PROGRAM FOR REDUCING TONER USAGE IN PRINT OUTPUT

(75) Inventors: Larry M. Ernst, Longmont, CO (US); Danielle Kathyrn Dittrich, Longmont, CO (US); Richard S. Lucky, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,859

(22) Filed: Mar. 27, 2000

(51) Int. Cl.⁷ .............................................. G06K 15/00
(52) U.S. Cl. ...................... 358/1.9; 358/3.02; 358/3.12
(58) Field of Search .................... 358/1.3, 1.8, 3.01, 358/3.02, 3.13, 3.16, 3.17, 3.18, 3.12, 3.3

(56) References Cited

U.S. PATENT DOCUMENTS

| | | | |
|---|---|---|---|
| 4,280,144 A | 7/1981 | Bacon | 358/280 |
| 4,681,424 A | 7/1987 | Kantor et al. | 355/14 R |
| 4,700,199 A | 10/1987 | Horlander | 346/76 |
| 4,701,836 A | 10/1987 | Horlander | 346/26 |
| 5,128,698 A | 7/1992 | Crawford et al. | 346/160 |
| 5,355,200 A | 10/1994 | Ohba et al. | 355/246 |
| 5,359,423 A | 10/1994 | Loce | 358/296 |
| 5,387,985 A | 2/1995 | Loce et al. | 358/447 |
| 5,390,004 A | 2/1995 | Hopkins | 355/208 |
| 5,480,240 A | 1/1996 | Bolash et al. | 400/124.01 |
| 5,546,170 A | 8/1996 | Ohba et al. | 355/246 |
| 5,583,621 A | 12/1996 | Narukawa | 355/246 |
| 5,646,670 A | 7/1997 | Seto et al. | 347/131 |
| 5,661,564 A | 8/1997 | Tomida et al. | 358/296 |
| 5,668,635 A | 9/1997 | Tomida et al. | 358/296 |
| 5,684,933 A | 11/1997 | Nagafusa | 395/109 |
| 5,696,845 A | 12/1997 | Loce et al. | 382/254 |
| 5,699,172 A | 12/1997 | Hattori et al. | 358/459 |
| 5,724,455 A | 3/1998 | Eschbach | 382/260 |
| 5,751,433 A | 5/1998 | Narendranath et al. | 358/298 |
| 5,751,470 A | 5/1998 | Damon | 358/298 |
| 5,784,091 A * | 7/1998 | Ema | 347/131 |
| 5,835,233 A | 11/1998 | Otsu et al. | 358/298 |
| 5,876,132 A | 3/1999 | Zable | 400/306 |
| 5,963,244 A | 10/1999 | Mestha et al. | 347/251 |

FOREIGN PATENT DOCUMENTS

| | | | |
|---|---|---|---|
| EP | 0858205 | 8/1998 | H04N/1/00 |
| JP | 7266615 | 10/1995 | B41J/2/44 |
| JP | 9277500 | 10/1997 | B41J/2/00 |
| JP | 10166660 | 6/1998 | |
| JP | 11055519 | 2/1999 | |

OTHER PUBLICATIONS

U.S. Appl. No. 09/535,859, filed Mar. 27, 2000.
U.S. Appl. No. 09/535,858, filed Mar. 27, 2000.

(Continued)

Primary Examiner—Jerome Grant, II
(74) Attorney, Agent, or Firm—David W. Victor; Konrad Rayne & Victor LLP

(57) ABSTRACT

Disclosed is a method, system, and program for reducing toner in an image comprised of raster pel data. A determination is made of pels surrounding subject pels. For each subject pel, a sub-pulse width power is generated to charge a sub-pel region within the subject pel based on a pattern of the surrounding pels of the subject pel. Further, for each subject pel, position information is generated indicating an alignment of the sub-pel region in the pel. The position information is used to position the sub-pel region produced by the sub-pulse width power in the pel.

52 Claims, 5 Drawing Sheets

OTHER PUBLICATIONS

M.J. Stanich, "Print–Quality Enhancement in Electrophotographic Printers", IBM J. Res. Develop., vol. 41, No. 6, Nov. 1997, pp. 669–678.

U.S. Appl. No. 09/099,113, entitled "A System, Method, and Program For Saving Toner/Ink in a Color Printer Without Sacrificing Image Quality".

U.S. Appl. No. 09/176,649, entitled "Method and System for Improved Performance of Adjustable Printer Clocks in an Electrophotographic Device", filed Oct. 21, 1998.

M. Takahashi et al., "Full–Color Ink–Jet Printer", Journal Paper, NEC Research and Development, No. 80, pp. 38–41, Jan. 1986 (abstract).

D. McMurtry et al., "Technology of the IBM 3800 Printing Subsystem Model 3", Journal Paper, IBM Journal of Research and Development, vol. 28, No. 3, pp. 257–262, May 1984 (abstract).

R.C. Miller, Jr., "Introduction to the IBM 3800 Printing Subsystem Models 3 and 8", Journal Paper, IBM Journal of Research and Development, vol. 28, No. 3, pp. 252–256, May 1984 (abstract).

Y.L. Yao, "High Resolution Display and Printing Technique", Journal Paper, IBM Technical Disclosure Bulletin, vol. 23, No. 11, pp. 5225–5226 (abstract).

* cited by examiner

METHOD, SYSTEM, AND PROGRAM FOR REDUCING TONER USAGE IN PRINT OUTPUT

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Using Look-up Tables to Filter Raster Data", by Richard S. Lucky, Larry M. Ernst, and Danielle K. Dittrich; and "Method, System, And Program For Producing a Look-up Table to Enhance Print Quality", by Danielle K. Dittrich, Larry M. Ernst, and Richard S. Lucky.

BACKGROUND OF THE INVENTION

1. Field of the Invention

The present invention relates to a method, system and program for reducing toner usage in print output.

2. Description of the Related Art

To print an image, a print engine processor, referred to herein as a raster image processor, converts the image in a page description language or vector graphics format to a bit mapped image indicating a value to print at each pixel of the image. Each bit representing a pixel that is "on" is converted to an electronic pulse. The electronic pulses generated from the raster pel data at which to deposit toner turns the laser beam on to positively charge the surface of a rotating drum, which is an organic photo-conducting cartridge (OPC), that has a coating capable of holding an electrostatic charge. The laser beam turns on and off to beam charges at pixel areas on a scan line across the drum that will ultimately represent the output image. After the laser beam charges all pels on the scan line indicated in the raster data, the drum rotates so the laser beam can place charges on the next scan line. The drum with the electrostatic positive charges then passes over negatively charged toner. The negatively charged toner is then attracted to the positive charged areas of the drum that form the image. The paper, which is negatively charged, passes over the roller drum and attracts the toner as the areas of the roller drum with the toner are positively charged to transfer the toner forming the image from the roller drum to the paper.

Many laser printers may filter the bit map images using a look-up table to alter the pulses generated for each pixel to accomplish a certain filtering result. For instance, filters can be used to provide an economy mode where toner is reduced, remove jagged edges, improve print quality enhancement or reduce the density of images. Typically, the laser printer will gather an area of data and replace either one or all the pulse values for the pixels based on the gathered area of pixel data matching a value in the look-up table. Such look-up tables modify the pixel output by altering the pulse normally used for an "on" pixel value with a pulse width modulator to shorten the pulse width to reduce the electric charge the laser beam places on the roller. Reducing the pulse width reduces the charged are for the pel on the roller and, hence, reduces the amount of toner attracted to the roller for that pel, thus reducing the amount of toner used to represent the pel.

There are two prior art techniques for reducing the amount of toner in print output. One technique, referred to as sub-pulse width modulation, reduces the laser current applied to each pel area on the roller to reduce the area of the electrical charge applied to the pel position on the roller, thereby attracting less toner. This technique requires that the laser be constantly switched on and off within each pel to place the sub-pel charge in a portion of the pel on the roller. This process of switching the laser on and off substantially increases electromagnetic radiation (EMI). To ensure that such printers that reduce tone by switching the laser on and off within each pixel comply with established EMI rules in various countries, electromagnetic patches are added to the printer to absorb the EMI radiation. The addition of these electromagnetic patches or other fixes to avoid the EMI radiation pollution significantly increases the manufacturing cost of the printer to a point where the use of sub-pulse width modulation to reduce toner usage in all black areas is not feasible.

A second approach to reduce toner usage is to apply a single symmetrical screen pattern, e.g., a checkerboard, over the total image to subtract pels from the image. Thus, the entire black area of an image is replaced with a checker board pattern to reduce in half the number of pels to which toner is attracted. The problem with this approach is that because data is removed without any consideration to the image structure, it is possible that the algorithm would delete significant portions of the image, such as edge pels that form the outline of the image. This reduces the edge resolution and quality of the image resulting in a "washed-out" appearance.

For the above reasons, there is a need in the art for an improved technique to reduce toner in an image in a manner that does not unduly degrade the quality of the image and to reduce electronic emissions.

SUMMARY OF THE PREFERRED EMBODIMENTS

To overcome the limitations in the prior art described above, preferred embodiments disclose a method, system, and program for reducing toner in an image comprised of raster pel data. A determination is made of pels surrounding subject pels. For each subject pel, a sub-pulse width power is generated to charge a sub-pel region within the subject pel based on a pattern of the surrounding pels of the subject pel. Further, for each subject pel, position information is generated indicating an alignment of the sub-pel region in the pel. The position information is used to position the sub-pel region produced by the sub-pulse width power in the pel.

Still further, for each subject pel, a determination is made as to whether the pattern of the surrounding pels indicate that the subject pel is in a black filled region. The position information is used to align the sub-pel regions in the subject pels in the black filled region to be adjacent to the sub-pel region in one adjacent subject pel in the black filled region.

In still further embodiments, the sub-pulse width power and position information is encoded in a look-up table that provides one output sub-pulse width power and position information for an input subject pel and surrounding pel pattern.

Preferred embodiments provide a technique for sub-pulse width modulation to reduce toner usage that minimizes EMI radiation by using position information to align sub-pel regions formed by the sub-pulse width modulations in adjacent pels next to each other so the laser beam does not have to turn on and off within every pel when generating the sub-pel regions in the black filled region. The preferred embodiment technique minimizes the number of times the laser beam must turn on and off to form sub-pel regions in pels in a black filled region to reduce toner usage. Further, with preferred embodiments, pels on an image edge are preserved and not eliminated as part of the toner reduction algorithm. This preserves image quality and avoids producing a "washed-out" appearance of the image by avoiding removal of edge pels that define the outline of an image.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Using Multiple Look-Up Tables to Filter an Image

Figure 1:
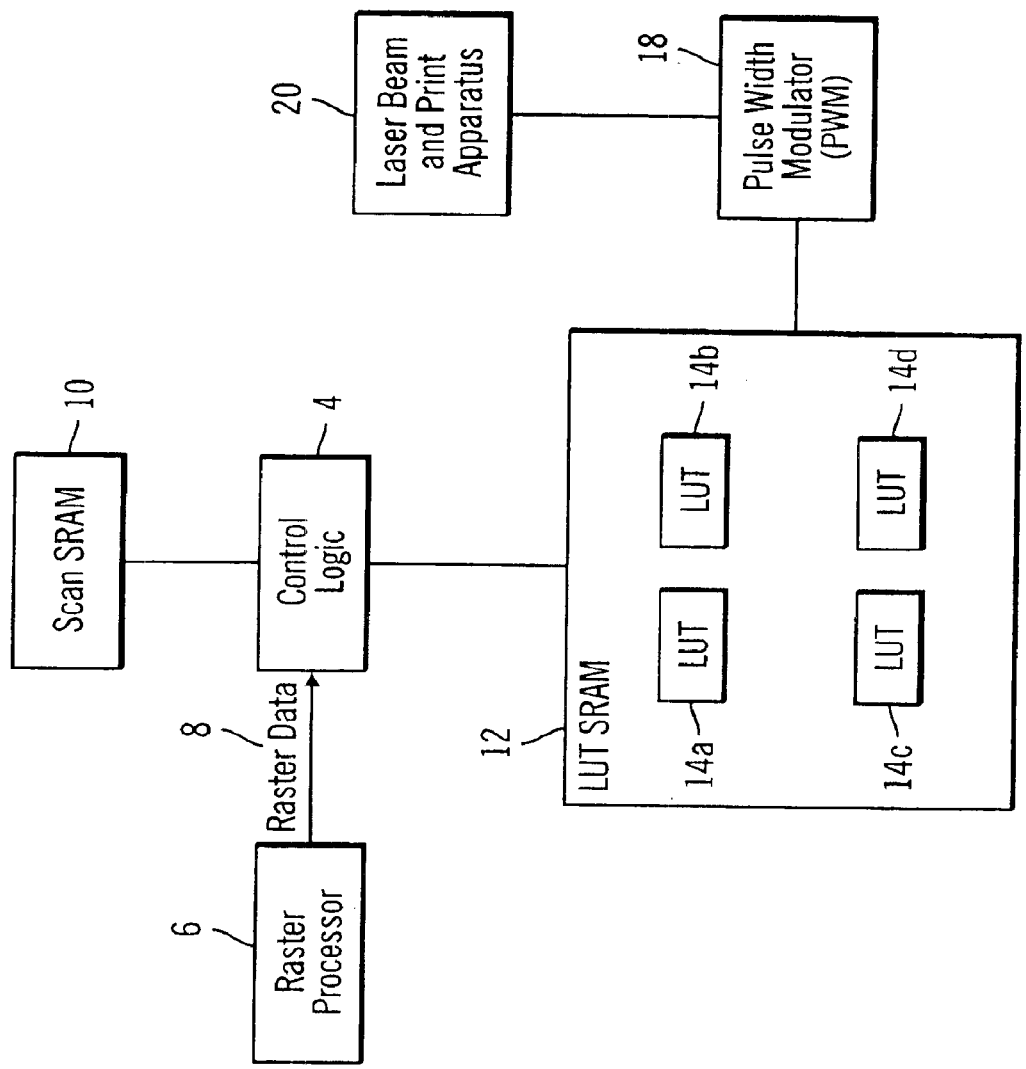
FIG. 1 illustrates a printing computing environment in which preferred embodiments of the present invention are implemented.

FIG. 1 illustrates a printing computing environment in which preferred embodiments are implemented. Control logic 4 comprises a programmable chip, such as a field programmable gate array (FPGA) chip, which includes logic to perform the preferred embodiment pel filtering operations. The raster processor 6 generates raster data 8 from vector graphics or page description language commands. The raster data 8 comprises scan lines of pels, where each pel has an "on" or "off" value and location information of the pel in the scan line. The control logic 4 accesses scan lines of raster data 8 and transfers the pels to a scan static random access memory (SRAM) 10. The control logic 4 will access data from the scan SRAM 10 and compare the accessed pel data with values in one of a selected look-up table (LUT) 14a, b, c, d that were previously loaded in a LUT SRAM 12. The control logic 4 is encoded with logic to compare accessed pel data with the LUT 14a, b, c or d to determine an output value for input peel data.

In the example of FIG. 1, the control logic 4 uses the LUTs 14a, b, c, d to accomplish a particular type of filter operation, e.g., print quality enhancement of text, images or double dot data, or toner reduction. Print quality enhancement may involve edge smoothing, compensating for density, etc.

The LUT tables 14a, b, c, d specify how to modify a pel based on the values of the surrounding pels. A pel is modified by modifying its pulse width. The modified or unmodified pel data, i.e., pulse width, is then transferred directly from one selected LUT 14a, b, c, or d to the pulse width modulator (PWM) 18 to generate an electronic pulse, i.e., voltage, which controls the laser beam 20 to electrically charge the area of the roller corresponding to the pel as part of the printing process. In preferred embodiments, the PWM 18 is capable of generating sixty-four different pulse widths for a pel having a value of "on".

Figure 2:
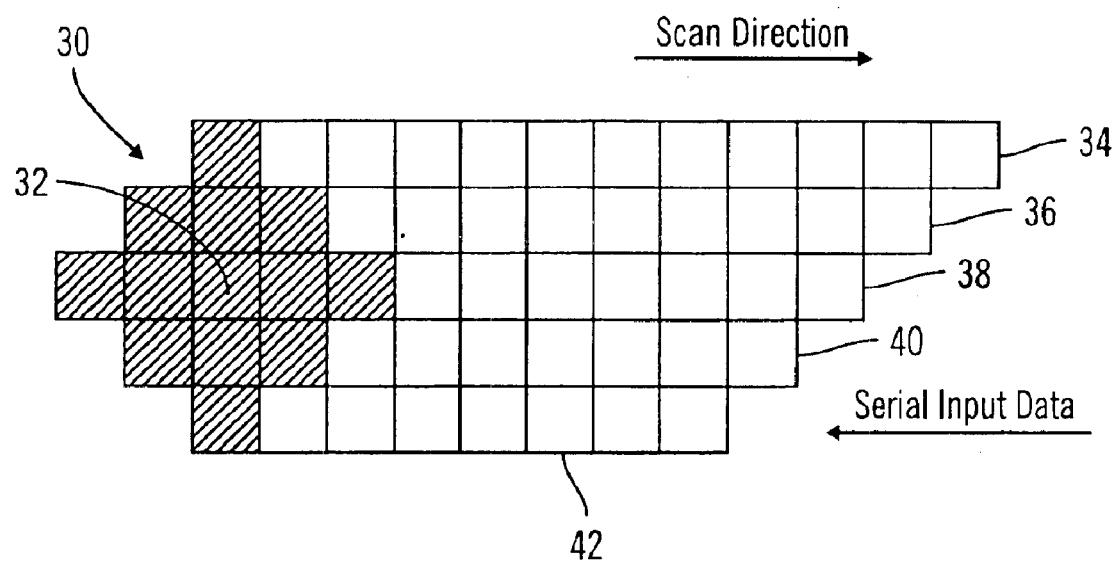
FIG. 2 illustrates a window of pel data accessed for filtering operations in accordance with preferred embodiments of th present invention.

FIG. 2 illustrates how scan line raster data is loaded into the scan SRAM 10 and accessed by the control logic 4. In FIG. 2, each block represents a pel, a white block represents buffered pel data and a darkened block represents one pel the control logic 4 is accessing in a window 30 of pels that will be considered during the filter operation. In preferred embodiments, the control logic 4 accesses a diamond shaped group of adjacent pels 30 from five different scan lines 34, 36, 38, 40, 42 that surround a center pel 32. In preferred embodiments, one or more of the LUTs 14a, b, c or d include an output value for each possible combination of values for the window 30. In the example of FIG. 2, this would require the LUTs 14a, b, c, d to provide $2^{13}$ possible output values as there are $2^{13}$ different possible arrangements of the thirteen pels in the window 30. Thus, the LUTs 14a, b, c, d specify an output value for each unique combination of the pels in the window 30. The output value provides an adjusted pulse width for the center pel 32 in the window 30. The purpose of the window is to provide an adjusted pulse for the center pel 32 based on the surrounding pels that have the most affect on the center pel 32.

In preferred embodiments, the window 30 is shaped as a diamond to approximate the circular shape of a charge the laser creates on the roller and the shape in which toner is applied to a pel. The toner applied to a pel may extend out in a circular range and affect other pels. Thus, based on the value of the pels surrounding the center pel 32, the LUTs 14a, b, c, d provide an adjusted pulse width value for the center pel 32 to accomplish the purpose of the LUT, e.g., print quality enhancement, toner reduction, etc., in a manner known in the art. The co-pending patent application entitled "Method, System, And Program For Producing a Look-up Table to Enhance Print Quality", which was incorporated by reference in its entirety above, provides methodologies for creating the LUT tables 14a, b, c, d to accomplish the purpose of the LUT table operation.

In preferred embodiments the scan SRAM 10 comprises a 32K×8 SRAM and a set of shift registers. The raster data 8 is delivered in a serial bit stream to the scan SRAM 10, such that eight bits are shifted in and written to the byte wide scan SRAM 10 every eight clocks. The control logic 4 gathers the raster data 8 one bit at a time and writes to the scan SRAM 10 once every eight bits. The pels in the window 30 are read by reading the first four scan lines 34, 36, 38, and 40 one at a time. The bottom scan line 42, which provides one pel to the window 30, is the input scan line being written to the SRAM 10 by the filter logic 14. The window 30 shifts right through the scan lines. After processing all pels in a scan line as the center pel 32, the window 30 would shift down in the transport direction to start including subsequent scan lines in the window 30. In this way, every pel in the bitmap at one point is the center pel 32 in the window 30 that is adjusted based on the values of the surrounding pels in the window. In preferred embodiments, only the original pel values from the raster data 8 are used in each window 30. Thus, after the center pel 32 is adjusted, when that previous center pel becomes a pel surrounding a center pel 32 in the window 30, the original value of that center pel from the raster data 8 is used, and not the adjusted pulse width value.

The preferred embodiment diamond shaped window 30 provides an improved data sampling over current windows used in filtering pels that are typically rectangular or square shaped, because the diamond shape approximates the actual shape of the laser charge imprint. Thus, the pels most likely to affect the center pel 32 are in the circular diamond shaped window 30. Because, in preferred embodiments, the LUTs provide an output value for every possible combination of pels in the window, minimizing the number of pels in the window by using a diamond shaped window as opposed to a rectangular shape, which includes a greater area of pels, makes it feasible for the LUTs 14a, b, c, d to provide one output value for every possible combination of pels in the window 30. Further, the diamond shaped window 30 considers the affect of surrounding pels to the north, south, east, and west of the center pel 32 as would a rectangular shaped window, but excludes four pels that would be included in a rectangular window that have less of an affect on the center pel 32 as they are farther from the center pel 32 than any pels in the diamond shaped window 30 and are generally outside of the circular radius of a charge for a pel.

In preferred embodiments, the control logic 4 may, in the middle of generating pels within a page and/or a scan line, switch the LUT 14a, b, c, d being used to alter the type of filter operation. For instance, this would allow a single scan line to include image data that needs to be generated with high quality that would require the image print quality enhancement LUT and algorithm as well as content that may be generated in an economy mode using the toner reduction LUT and algorithm. A toner reduction LUT would tend to reduce the pulse width for each pel, thereby reducing the size of the charged area on the roller exposed to the laser beam and the amount of toner that would gather at the charged area.

In preferred embodiments, the control logic 4 may, in the middle of generating pels within a page and/or a scan line, switch the LUT 14a, b, c, d to alter the type of filter operation. For instance, this would allow a single scan line to include image data that needs to be generated with high quality that would require the image print quality enhancement LUT as well as content that may be generated in an economy mode using the toner reduction LUT. A toner reduction LUT would tend to reduce the pulse width for each pel, thereby reducing the size of the charged area on the roller exposed to the laser beam and the amount of toner that would gather at the charged area.

To provide information on which print mode to use, e.g, print quality enhancement for image, text or double dot or toner reduction, the raster data 8 may include switching points and a new print mode for a switching point. A switching point would comprise a scan line, i.e., transport position, and pel position within the scan line at which to change the print mode. An additional mode is bypass mode. In bypass mode, the serial data is sent directly to the printer engine without being stored in the scan SRAM 10 and without being filtered using the LUTs 14a, b, c, d. Initially, the control logic 4 is in bypass mode until changed as a result of a switching point. Further, upon initialization, all the LUTs 14a, b, c, d are loaded into the LUT SRAM 12 from a non-volatile storage location, such as disk or flash memory. In this way, all the LUT tables 14a, b, c, d are readily accessible to the control logic 4. The copending patent application entitled "Method, System, And Program For Using Look-up Tables to Filter Raster Data", and which was incorporated by reference above, provides further details of the process of switching the LUTs 14a, b, c when processing the pels in a scan line.

Reducing Toner Using Location Information

As discussed, one of the LUTs 14a, b, c or d is used to reduce the amount of toner used in the print output. In preferred embodiments, the control logic 4 includes logic to apply different techniques for reducing toner depending on whether a subject pel, which is the current pel the control logic 4 is considering and determining how to modify, is in a dense black filled area or on an image edge. If a subject pel is in a dense black filled area, then the toner reduction LUT is encoded to reduce the pulse width to attract less toner. In such case, image quality is not adversely affected as the reduction is made in an all black area, i.e., there is no effect on the image edges. However, in preferred embodiments, if the pel is on the edge of an image, then the LUT will be encoded to provide a sub-pel pulse width at the edge pel, so the edge definition is not removed in order to fully delineate the edge transitions from a black area (toner area) to a white area (no toner area). Further, in preferred embodiments, the toner reduction LUT may indicate less toner usage for the edge pel than the pels in the middle of the black filled area. The benefit of using less toner for the edge pels than the pels in the black filled area is to maintain the halftone monotonic in the image. This means that there is an increasing reduction in density as the image progresses from the black filled area to the white area. Further, using less toner in an edge pel reduces any spillover of the edge pel into the adjacent white pel, which would blur the image and produce jaggedness.

Figure 3:
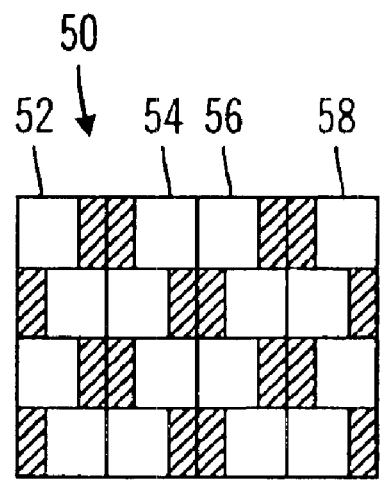
FIG. 3 illustrates a pattern for applying sub-pel regions to pels to reduce toner usage in accordance with preferred embodiments of the present invention.

In preferred embodiments, to save toner in a black filled area using sub-pulse width modulation and to avoid the problem of constantly having to switch the laser beam on and off in each pel, preferred embodiments align the sub-pulse width within each pel so the sub-pel charge region in every pel is aligned flush with the sub-pel region in one adjacent pel. FIG. 3 illustrates the result of this process. Assuming that the 4×4 block of pels 50 shown in FIG. 3 is contained in an all black filled area of print output, the preferred embodiments would align the sub-pel regions printed in each pel so that the sub-pel region in each pel is adjacent to the sub-pel region in one adjacent pel. This alignment of the sub-pel regions reduces the number of times the laser beam has to be switched on and off when doing sub-pulse width modulation as the laser beam may remain on to charge the sub-pel regions of two pels. For instance, in pel 52, the laser beam is turned on to charge the rightmost portion of pel 52 and remains on to charge the leftmost portion of pel 54, and then turns off, before turning on again in pel 56 to charge the adjacent sub-pel regions in pels 56 and 58. In this way, sub-pulse modulation can be used to reduce the amount of toner in all black areas and EMI radiation is likewise cut in half as a result of using the location information to align sub-pels of toner within the pels. With this preferred embodiment technique for sub-pulse width modulation, EMI radiation is reduced sufficiently to allow printers to be produced at a competitive and acceptable cost of manufacturing.

Further, to avoid having stripes appear through the toner reduced black area, in preferred embodiments, the alignment positions of the sub-pels are alternated every scan line, as shown in FIG. 3, to form a checkerboard pattern that avoids the appearance of stripes through the reduced toner region.

Figure 4:
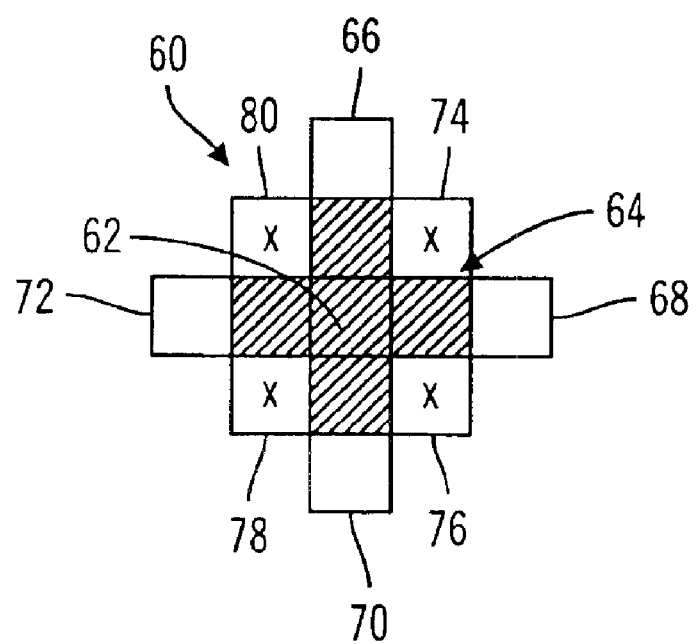
FIG. 4 illustrates how surrounding pels are considered for a subject pel to determine the toner reduction filtering operation for the subject pel in accordance with preferred embodiments of the present invention.

To determine whether to apply the sub-pel checkerboard pattern shown in FIG. 3, in preferred embodiments, after accessing a window of data 30 (FIG. 3), the control logic 4 would further consider a cross of pels 64 within the diamond shaped window 60, as shown in FIG. 4. This cross of black pels 64 can be used to determine whether the center pel 62 is within an all black filled area. If all the pels in the cross 64 are black, then the center pel 62 is within an all black region. This allows the LUT to be encoded to provide the aligned sub-pel pattern described above for those center pels 62 that are definitely in an all black region. For those pels that are not in an all black region, alternative toner reduction steps can be taken to ensure that edges are not harmed and image quality does not suffer when reducing the amount of toner.

In preferred embodiments, to produce the sub-pel checkerboard pattern shown in FIG. 3, the control logic 4 encodes position information into pels 66, 68, 70, and 72 of the window 60 of pels. The control logic 4 determines the position of a center pel 62 with respect to a 4×4 section of pels within the all black filled area. In this way, the scan lines are segmented into 4×4 sections of pels for purposes of encoding position information for the center pel 62, i.e., subject pel, being considered. The pels 66 and 70 include position information indicating the transport or vertical position of the center pel 62 in the 4×4 section and the pels 68 and 72 include position information indicating the scan or horizontal position of the center pel 62. Pels 74, 76, 78, and 80 in the window 60 include pel data from the image.

In preferred embodiments, the LUT output values include both a power level for the sub-pulse width modulation and position information indicating the alignment of the sub-pel charge region in the pel to accomplish the pattern shown in FIG. 3. This information directs the laser to generate a charge for the sub-pulse width duration at a particular alignment within the pel. As discussed, the pulse width modulator 18 may generate sub-pulse widths at increments of 1/64th of the full power that would be used in a single pel. Because position bits 66, 68, 70, 72 are provided to the toner reduction LUT, indicating a position at one of sixteen positions in the 4×4 block, the toner reduction LUT is encoded to ensure the alignment of the sub-pels to provide the checkerboard pattern shown in the 4×4 block in FIG. 3. For example, the toner reduction LUT may be encoded to right align the center pel in the first position in each even scan line, and then alternate the right/left alignment in each subsequent pel. When the position information indicates a transport position of an odd scan line in the 4×4 block, then the toner reduction LUT is preferably encoded to left align the first sub-pel and alternate the alignment for each subsequent pel in the odd scan lines. In this way, the LUT is encoded to alternate the alignment order in odd and even scan lines or increment in the transport direction in the 4×4 block to ensure that the sub-pel regions are clustered to provide the checker board pattern shown in FIG. 3 that reduces EMI radiation and avoids ungainly vertical lines through the black filled region.

Figure 5:
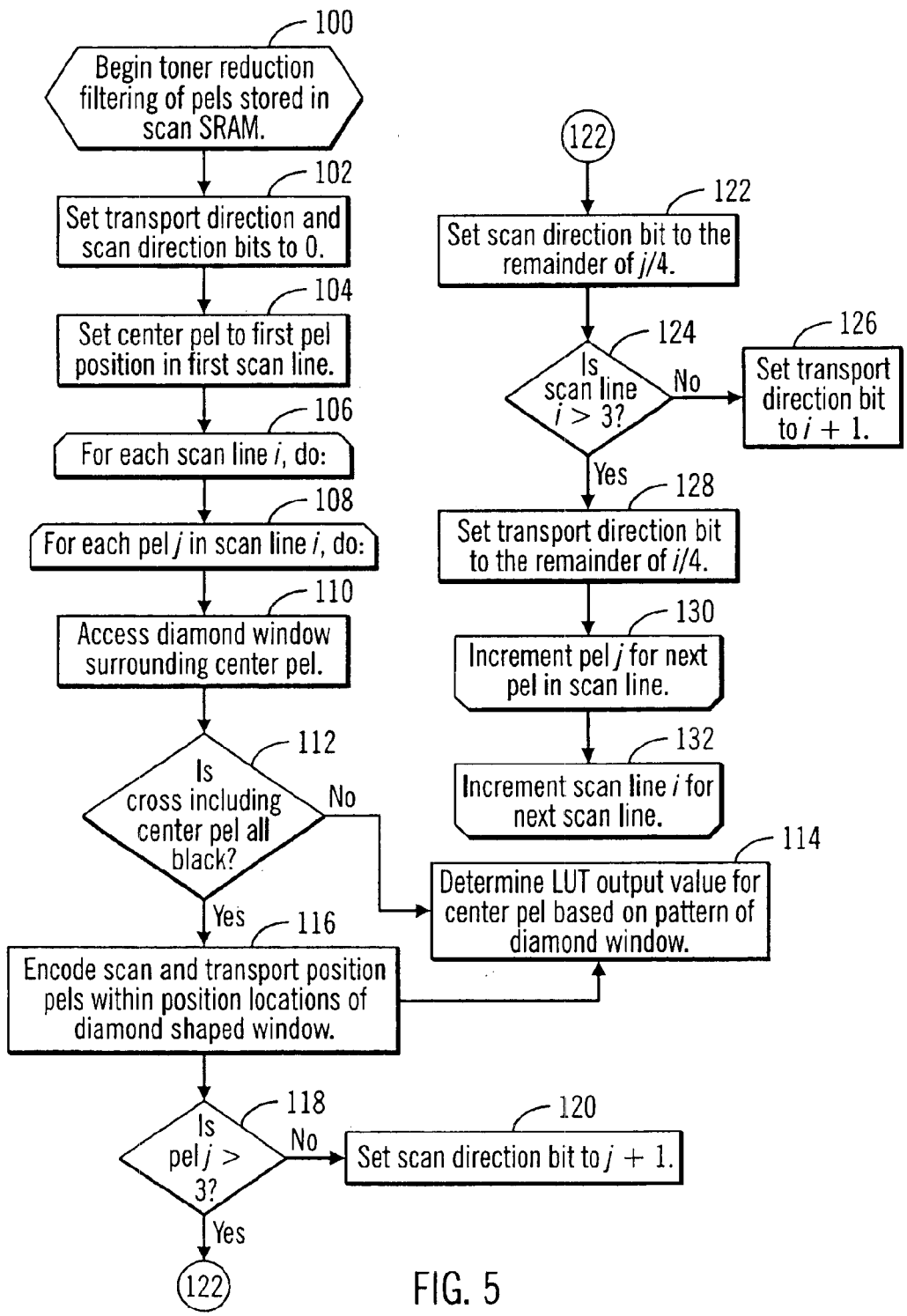
FIG. 5 illustrates toner reduction logic implemented in the filter logic to reduce toner in accordance with preferred embodiments of the present invention.

FIG. 5 illustrates logic implemented in the control logic 4 toner using the toner reduction LUT 14a, b, c or d to perform the preferred embodiment toner reduction operations. Control begins at block 100 with the control logic 4 beginning the toner reduction filtering operation of pels buffered in the scan SRAM 10. The control logic 4 initializes variables by setting (at block 102) the transport direction bits 66 and 70 and the scan direction bits 68 and 72 to zero and setting (at block 104) the center pel to the first pel position in the first scan line. From blocks 106 to 132, the control logic 4 performs loops to process the pels for each scan line i and in each pel position j within a scan line i that are buffered in the scan SRAM 10. Within these loops, the control logic 4 accesses a diamond window of pels, e.g., window 60 (FIG. 4) surrounding the center pel 62. If a cross of pels 64 surrounding the accessed center pel 62 within the window 60 are not all black (at block 112), then the center pel 64 is not in an all black filled region. In such case, the control logic 4 determines an output value for the center pel 62 from the toner reduction LUT for the pattern of the diamond shaped window 60 being considered, which includes all pel data.

As discussed, in preferred embodiments, the toner reduction LUT provides one output value for each possible pattern in the diamond shaped window 60. Otherwise, if all the pels in the cross 64 are black, then the control logic 4 encodes (at block 116) the scan and transport position pels 66, 68, 70, and 72 with the current scan and transport position of the center pel 62 in the current 4×4 section and then determines (at block 114) the output value from toner reduction LUT operation based on the pattern of the diamond shaped window 60. In such case, the position information of the center pel 62 is used to determine the alignment of the sub-pel region in the pel, e.g., right or left justification, to produce the sub-pel checkerboard pattern shown in FIG. 3 that minimizes the EMI radiation from the sub-pel pulse width modulation operations.

After using the toner reduction LUT to determine one toner reducing output value for the center pel 62, the control logic 4 must then determine the appropriate scan and transport direction location bits for the next center pel with respect to the 4×4 segment of pels. For this purpose, if pel j is less than 3 (at block 118), i.e., the pel is in the first 4×4 section, then the scan direction bit is set (at block 120) to j plus one. Otherwise, if the pel j is greater than three, then the pel j is in another 4×4 section. To determine the offset in the 4×4 section of the next pel, the scan direction bit is set (at block 122) to the remainder of j divided by four. To determine the transport position in the 4×4 section, if the scan line is less than three (at block 124), then the transport direction bit is set (at block 126) to i plus one. Otherwise if the scan line i is greater than three (at block 124), then the scan line is at a transport position beyond the first 4×4 section. In such case, the transport direction bits 66 and 70 are set (at block 128) to i divided by four, to determine the offset within the 4×4 section.

With the above logic, the LUT output value for subject pels in an all black filled region is based on the position information encoded in the position bits 66, 68, 70, and 72. The toner reduction LUT is encoded to provide specific toner reduction sub-pulse widths for a pel based on the location of the center pel in the image. As discussed above, the toner reduction LUT is encoded with output values to form the sub-pel checkerboard pattern shown in FIG. 3 for those center pels in an all black filled area. For those pels that are not within an all black region, the LUT output value would take into account whether the center pel is at an image edge. The center pel 62 is at an image edge if the data pels in the cross 64 and 74, 76, 78, and 80 match one of the patterns shown in FIGS. 6a, b, c, d. For such patterns in the window, the LUT could be encoded to provide a toner reduction value for the edge pel that preserves image quality. For instance, the toner reduction LUT could be encoded to provide an output value for such edge pel that has a lower pulse width than adjacent pels within the all black filled area of the image and that is justified to align toward the black filled region of the image to avoid any spillover from the edge pel to the adjacent white pel.

The preferred embodiments thus provide a technique that reduces toner in all black filled areas in a manner that not only substantially reduces toner but that also minimizes EMI radiation and pollution. Toner is saved by using sub-pel pulse width modulation to use less toner in the pel and by aligning the sub-pel regions next to each other in adjacent pels to minimize the number of times the laser beam must be switched on and off. However, alternative output values for edge and dense area pels may be provided to reduce toner and maintain image quality. The copending patent application "Method, System, And Program For Producing a Lookup Table to Enhance Print Quality", which was incorporated by reference above, provides further techniques for encoding values in the LUT to enhance image quality.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

In preferred embodiments, there are binary values for each pel. However, in alternative embodiments there may be more than two values for each pel. In such case, the LUTs 14a, b, c, d would have to provide different output values for the multiple possible pel values.

In preferred embodiment, the control logic is implemented as hardware, e.g., a Field Programmable Gate Array (FPGA), Application Specific Integrated Circuit (ASIC), etc. In alternative embodiments, the control logic may be implemented as programmable code in a programmable processor.

In preferred embodiments, there was one LUT 14a, b, c, d for each different type of print mode. In alternative embodiments, there may be multiple LUT tables for the same print mode and, at the same time, different LUT tables for different print modes.

Examples of print modes, such as print quality enhancement and toner reduction were described. However, additional LUTs may be provided for any different type of filtering operation that may be used to modify the pulse width for a pel to alter the appearance of the output and/or reduce the toner used.

In preferred embodiments, there is a LUT SRAM 12 and scan SRAM 10. These SRAMs 10 and 12 may be implemented in the same SRAM chip or dispersed throughout multiple SRAM chips. In alternative embodiments, the LUTs 14a, b, c, d may be maintained in a magnetic memory, as opposed to an electronic memory such as an SRAM. Still further, the LUTs 14a, b, c, d may be encoded in hardware logic, such as ASICs, FPGAs, Electronically Erasable Programmable Read-Only-Memory (EEPROM), etc. In alternative embodiments, any type of volatile memory device may be used for the SRAMs 10 and 12. However, in preferred embodiments, the LUTs 14a, b, c, d are all maintained in the same high-speed memory to allow the control logic 4 to switch between LUTs 14a, b, c, d within the pel frequency to maintain printer throughput. In alternative embodiments, the LUTs may be switched at frequencies less or greater than the pel frequency. The LUTs may be programmed using Verilog, which may then be used to generate the hardware.

In preferred embodiments, the window of data considered has a diamond shape. However, different shaped windows of pel data may be used with the preferred embodiment dynamic LUT table technique. Further, more or less pels may be included in the window than the thirteen pel bits describe above.

In preferred embodiments, the LUTs provide a single output pel value for the center pel in the window. In alternative embodiments, the LUT may provide multiple substitute modified pulse values for multiple pels in the window.

Figure 6A:
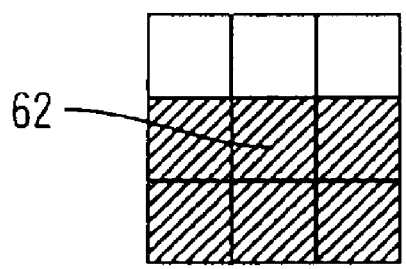
FIG. 6 illustrates patterns indicating that the center pel is on an image edge.
Figure 6B:
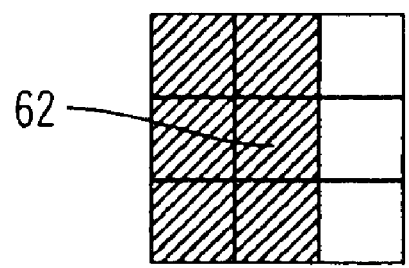
Figure 6C:
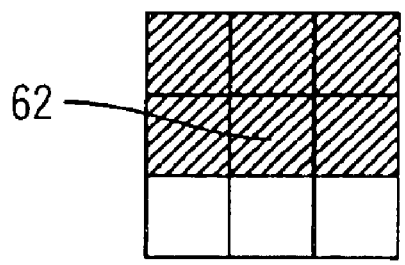
Figure 6D:
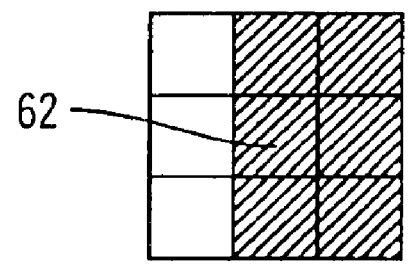

Further, the preferred embodiments described the use of the 1-3-1 cross shape 64 used to determine whether a pel is located within an all black filled area and the patterns shown in FIGS. 6a, b, c, d to determine whether a pel is on an image edge. However, in alternative embodiments, alternative pattern checking may be performed by either the algorithm or encoded in the toner reduction LUT table to determine whether a pel is in an all black dense region or on an image edge.

In preferred embodiments, toner was reduced in an all black filled area by using location information encoded into the pels to align sub-pel regions in adjacent pels to provide a sub-pel checkerboard pattern that reduces EMI emissions. In alternative embodiments, the position information may be used in alternative ways to reduce toner. For instance, every other pel, as determined by the location information, in an all black region can be set to white to provide a checkerboard pattern in the all dense area in a manner that does not degrade the image edges. Still further techniques than those described above may be used to encode the toner reduction LUT output values for pels on an edge or not within an all black filled area.

In preferred embodiments, the laser printer uses the laser to write or discharge the photoconductor voltage in the areas of the image defined as black (or areas where toner is to be placed). The toner color could be black, magenta, cyan, yellow, or other convenient color. This process is know in the industry as "discharge area development" (DAD), where toner adheres only to areas where the photoconductor is discharged. An alternative embodiment where the charges are the opposite of the DAD system is known in the art as "charge area development" (CAD). The CAD process is used in all electrophotography copiers. With CAD, the laser is used to write or discharge the photoconductor voltage in image areas that are white (or areas where toner is not be placed). Again the toner color could be black, magenta, cyan, yellow, or any other color. Toner adheres only to areas where the photoconductor is charged, which in the CAD process are those areas not impacted by the laser. In the CAD process, the photoconductor latent electrostatic image is the "negative" of the photoconductor latent electrostatic image in the DAD process.

For the CAD process, the toner reduction LUT would consider patterns that are the opposite of those considered for the DAD process where the center pel is black. Thus, the same pulse width and position information provided for the LUTs 14a, b, c, d described above having a black center pel would be provided for white center pels having a surrounding pattern the opposite of the pattern provided for the black center pel. With the CAD process, the sub-pulse width power would charge those pels which are white so that toner will not be attracted to the sub-pel regions charged by the laser.

In summary, preferred embodiments disclose a method, system, and program for reducing toner in an image comprised of raster pel data. A determination is made of pels surrounding subject pels. For each subject pel, a sub-pulse width power is generated to charge a sub-pel region within the subject pel based on a pattern of the surrounding pels of the subject pel. Further, for each subject pel, position information is generated indicating an alignment of the sub-pel region in the pel. The position information is used to position the sub-pel region produced by the sub-pulse width power in the pelf.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for reducing toner in an image comprised of raster pel data, comprising:
   determining surrounding pels of subject pels;
   for each subject pel, generating a sub-pulse width power to charge a sub-pel region within the subject pel based on a pattern of the surrounding pels of the subject pel, wherein the charged sub-pel region is less than a region of the subject pel; and
   for each subject pel, generating position information indicating an alignment of the sub-pel region in the pel, wherein the position information is used to position the sub-pel region produced by the sub-pulse width power in the pel.

2. The method of claim 1, wherein toner is attracted to the charged sub-pel region.

3. The method of claim 1, further comprising:
   for each subject pel, determining whether the pattern of the surrounding pels indicates that the subject pel is in a black filled region, wherein the position information is used to align the sub-pel region in the subject pel in the black filled region to be adjacent to the sub-pel region in one adjacent subject pel in the black filled region.

4. The method of claim 3, wherein the aliment of the sub-pels forms a checkerboard pattern.

5. A method for reducing toner in an image comprised of raster pel data, comprising:
   determining surrounding pels of subject pels;
   for each subject pel, generating a sub-pulse width power to charge a sub-pel region within the subject pel based on a pattern of the surrounding pels of the subject pel; and
   for each subject pel, generating position information indicating an alignment of the sub-pel region in the pel, wherein the position information is used to position the sub-pel region produced by the sub-pulse width power in the pel, and wherein the position information clusters the sub-pel region of adjacent pels in order to reduce electromagnetic radiation.

6. The method of claim 5, wherein the surrounding pels include pels from the scan line including the subject pel and from scan lines adjacent to the subject pel, wherein the subject pel is in the black filled region if a plurality of the surrounding pels are all black.

7. The method of claim 6, wherein the subject pel is in the black filled region if the plurality of the pels that surround the subject pel that are all black form a cross shape.

8. The method of claim 6, wherein the surrounding pels and subject pel form a data window of pels, further comprising:
   encoding pel positions in the data window to include location information of the subject pel with respect to other pels if the subject pel is in one black filled region; and
   using the position information to align the sub-pel regions in the subject pels in the black filled region to be adjacent to the sub-pel region in one adjacent subject pel in the black filled on.

9. The method of claim 8, wherein the data window forms a diamond shape with the subject pel at the center of the diamond shaped window.

10. The method of claim 8, wherein the sub-pulse width power and position information are encoded in a look-up table that provides one output value including sub-pulse width power and position information for an input subject pel and surrounding pel pattern, and wherein the look-up table is encoded to provide the position information that is used to align sub-pel regions in pels in the black filled region to be adjacent to the sub-pel region in one adjacent subject pel for input data windows that are encoded with position information.

11. The method of claim 6, wherein the surrounding pels and subject pel form a data window of pels, further comprising, for each subject pel:
   determining from the pels in the data window whether the subject pel is on an edge of an image of black pels; and
   using the data window as input to a look-up table that provides one output sub-pulse width power and position information for different input data window patterns including patterns that indicate that the subject pel is in one black filled region or on one image edge.

12. The method of claim 11, wherein the look-up table is encoded to align pels on the edge toward the black filled region.

13. The method of claim 11, wherein the look-up table is encoded to provide a sub-pulse width power level for pels on the edge that is less than the sub-pulse width power level for pels in the black filled region.

14. A method for reducing toner in an image comprised of raster pel data, comprising:
   determining surrounding pels of subject pels;
   for each subject pel, generating a sub-pulse width power to charge a sub-pel region within the subject pel based on a pattern of the surrounding pels of the subject pel; and
   for each subject pel, generating position information indicating an alignment of the sub-pel region in the pel, wherein the position information is used to position the sub-pel region produced by the sub-pulse width power in the pel, and wherein the sub-pulse width power and position information is encoded in a look-up table that provides one output sub-pulse width power and position information for an input subject pel and surrounding pel pattern.

15. A system for reducing toner in an image comprised of raster pel data, comprising:
   means for determining surrounding pels of subject pels;
   means for generating, for each subject pel, a sub-pulse width power to charge a sub-pel region within the subject pel based on a pattern of the surrounding pels of the subject pel, wherein the charged sub-pel region is less than a region of the subject pel; and
   means for generating, for each subject pel, position information indicating an alignment of the sub-pel region in the pel wherein the position information is used to position the sub-pel region produced by the sub-pulse width power in the pel.

16. The system of claim 15, wherein toner is attracted to the charged sub-pel region.

17. The system of claim 16, further comprising:
   means for determining, for each subject pel, whether the pattern of the surrounding pels indicates that the subject pel is in a black filled region, wherein the position information is used to align the sub-pel region in the subject pel in the black filled region to be adjacent to the sub-pel region in one adjacent subject pel in the black filled region.

18. The system of claim 17, wherein the alignment of the sub-pels forms a checkerboard pattern.

19. A system for reducing toner in an image comprised of raster pel data, comprising:
   means for determining surrounding pels of subject pels;
   means for generating, for each subject pel, a sub-pulse width power to charge a sub-pel region within the subject pel based on a pattern of the surrounding pels of the subject pel; and
   means for generating, for each subject pel, position information indicating an alignment of the sub-pel region in the pel, wherein the position information is used to position the sub-pel region produced by the sub-pulse width power in the pel, and wherein the position information clusters the sub-pel region of adjacent pels in order to reduce electromagnetic radiation.

20. The system of claim 19, wherein the surrounding pels include pels from the scan line including the subject pel and from scan lines adjacent to the subject pel, wherein the subject pel is in the black filled region if a plurality of the surrounding pels are all black.

21. The system of claim 20, wherein the subject pel is in the black filled region if the plurality of the pels that surround the subject pel that are all black form a cross shape.

22. The system of claim 20, wherein the surrounding pels and subject pel form a data window of pels, further comprising:
   means for encoding pel positions in the data window to include location information of the subject pel with respect to other pels if the subject pel is in one black filled region; and
   means for using the position information to align the sub-pel regions in the subject pels in the black filled region to be adjacent to the sub-pel region in one adjacent subject pel in the black filled region.

23. The system of claim 22, wherein the data window forms a diamond shape with the subject pel at the center of the diamond shaped window.

24. The system of claim 22, wherein the sub-pulse width power and position information are encoded in a look-up table that provides one output value including sub-pulse width power and position information for an input subject pel and surrounding pel pattern, and wherein the look-up table is encoded to provide the position information that is used to align sub-pel regions in pels in the black filled region to be adjacent to the sub-pel region in one adjacent subject pel for input data windows that are encoded with position information.

25. The system of claim 20, wherein the surrounding pels and subject pel form a data window of pels, further comprising, for each subject pel:
   means for determining from the pels in the data window whether the subject pel is on an edge of an image of black pels; and
   means for using the data window as input to a look-up table that provides one output sub-pulse width power and position information for different input data window patterns including patterns that indicate that the subject pel is in one black filled region or on one image edge.

26. The system of claim 25, wherein the look-up table is encoded to align pels on the edge toward the black filled region.

27. The system of claim 25, wherein the look-up table is encoded to provide a sub-pulse width power level for pels on the edge that is less than the sub-pulse width power level for pels in the black filled region.

28. A computer-readable transmission medium including a look-up table data structure used for reducing toner in an image comprised of raster pel data, comprising:
   a plurality of output values, wherein one output value is provided for at least one pattern of pels including a subject pel, wherein the output value is substituted for the subject pel, and wherein the output value comprises a sub-pulse width power to charge a sub pel region within the subject pel, wherein the charged sub-pel region is less than a region of the subject pel, and position information indicating an alignment of the sub-pel region in the pel, wherein the position information is used to position the sub-pel region produced by the sub-pulse width power in the pel.

29. The computer-readable transmission medium of claim 28, wherein toner is attracted to the charged sub-pel region.

30. The computer-readable transmission medium of claim 28, wherein the position information clusters the sub-pel region of adjacent pels in order to reduce electrogmanetic radiation.

31. The computer-readable transmission medium of claim 28, wherein the output values for subject pels in a black filled region include position information that aligns the sub-pel region in the subject pels in the black filled region to be adjacent to the sub-pel region in one adjacent subject pel in the black filled region.

32. The computer-readable transmission medium of claim 28, wherein the output values for subject pels on an image edge are encoded with position information to align the subject pels on the image edge toward a black filled region.

33. The computer-readable transmission medium of claim 28, wherein the output values for subject pels on the image edge are encoded with a sub-pulse width power level that is less than the sub-pulse width power level for pels in the black filled region.

34. A computer readable transmission medium including a look-up table data structure used for reducing toner in an image comprised of raster pel data, comprising:
   a plurality of output values, wherein one output value is provided for at least one pattern of pels including a subject pel, wherein the output value is substituted for the subject pel, and wherein the output value comprises a sub-pulse width power to charge a sub-pel region within the subject pel and position information indicating an alignment of the sub-pel region in the pel, wherein the position information is used to position the sub-pel region produced by the sub-pulse width power in the pel, wherein the output values for subject pels in a black filled region include position information that aligns the sub-pel region in the subject pels in the black filled region to be adjacent to the sub-pel region in one adjacent subject pel in the black filled region, and wherein the position information for the output values of subject pels in the black filled region aligns the sub-pel regions to form a checkerboard pattern.

35. The computer-readable transmission medium of claim 34, wherein the subject pels are in the black filled region if a plurality of the surrounding pels are all black.

36. The computer-readable transmission medium of claim 35, wherein the subject pel is in the black filled region if the plurality of the pels that surround the subject pel that are all black form a cross shape.

37. A computer-readable transmission medium including a look-up table data structure used for reducing toner in an image comprised of raster pel data, comprising:

a plurality of output values, wherein one output value is provided for at least one pattern of pels including a subject pel, wherein the output value is substituted for the subject pel, and wherein the output value comprises a sub-pulse width power to charge a sub-pel region within the subject pel and position information indicating an alignment of the sub-pel region in the pel, wherein the position information is used to position the sub-pel region produced by the sub-pulse width power in the pel, and where the surrounding pelts for which an output value is provided in the look-up table data structure form a diamond shape with the subject pel at the center of the diamond shaped window.

38. An article of manufacture for reducing toner in an image comprised of raster pel data, wherein the article of manufacture causes operations to be performed, the operations comprising:

determining surrounding pels of subject pels;

for each subject pel, generating a sub-pulse width power to charge a sub-pel region within the subject pel based on a pattern of the surrounding pels of the subject pel, wherein the charged sub-pel region is less than a region of the subject pel; and for each subject pel, generating position information indicating an alignment of the sub-pel region in the pel, wherein the position information is used to position the sub-pel region produced by the sub-pulse width power in the pel.

39. The article of manufacture of claim 38, wherein toner is attracted to the charged sub-pel region.

40. The article of manufacture of claim 38, wherein the operations further comprise:

for each subject pel, determining whether the pattern of the surrounding pels indicates that the subject pel is in a black filled region, wherein the position information is used to align the sub-pel region in the subject pel in the black filled region to be adjacent to the sub-pel region in one adjacent subject pel in the black filled region.

41. The article of manufacture of claim 40, wherein the alignment of the sub-pels forms a checkerboard pattern.

42. The article of manufacture of claim 40, wherein the surrounding pels include pels from the scan line including the subject pel and from scan lines adjacent to the subject pel, wherein the subject pel is in the black filled region if a plurality of the surrounding pels are all black.

43. The article of manufacture of claim 42, wherein the subject pel is in the black filled region if the plurality of the pels that surround the subject pel that are all black form a cross shape.

44. The article of manufacture of claim 42, wherein the surrounding pels and subject pel form a data window of pels, further comprising: encoding pel positions in the data window to include location information of the subject pel with respect to other pels if the subject pel is in one black filled region; and using the position information to align the sub-pel regions in the subject pels in the black filled region to be adjacent to the sub-pel region in one adjacent subject pel in the black filled.

45. The article of manufacture of claim 44, wherein the data window forms a diamond shape with the subject pel at the center of the diamond shaped window.

46. The article of manufacture of claim 44, wherein the sub-pulse width power and position information are encoded in a look-up table that provides one output value including sub-pulse width power and position information for an input subject pel and surrounding pel pattern, and wherein the look-up table is encoded to provide the position information that is used to align sub-pel regions in pels in the black filled region to be adjacent to the sub-pel region in one adjacent subject pel for input data windows that are encoded with position information.

47. The article of manufacture of claim 42, wherein the surrounding pels and subject pel form a data window of pels, further comprising, for each subject pel:

determining from the pels in the data window whether the subject pel is on an edge of an image of black pels; and using the data window as input to a look-up table that provides one output sub-pels width power and position information for different input data window patterns including patterns that indicate that the subject pel is in one black filled region or on one image edge.

48. The article of manufacture of claim 47, wherein the look-up table is encoded to align pels on the edge toward the black filled region.

49. The article of manufacture of claim 47, wherein the look-up table is encoded to provide a sub-pulse width power level for pels on the edge that is less than the sub-pulse width power level for pels in the black filled region.

50. An article of manufacture for reducing toner in an image comprised of raster pel data wherein the article of manufacture causes operations to be performed, the operations comprising:

determining surrounding pels of subject pels;

for each subject pel, generating a sub-pulse width power to charge a sub-pel region within the subject pel based on a pattern of the surrounding pels of the subject pel; and for each subject pel, generating position information indicating an alignment of the sub-pel region in the pel, wherein the position information is used to position the sub-pel region produced by the sub-pulse width power in the pel, and wherein the position information clusters the sub-pel region of adjacent pels in order to reduce electrogmanetic radiation.

51. An article of manufacture for reducing toner in an image comprised of raster pel data, wherein the article of manufacture causes operations to be performed, the operations comprising:

determining surrounding pels of subject pels;

for each subject pel generating a sub-pulse width power to charge a sub-pel region within the subject pel based on a pattern of the surrounding pels of the subject pel; and for each subject pel, generating position information indicating an alignment of the sub-pel region in the pel, wherein the position information is used to position the sub-pel region produced by the sub-pulse width power in the pel, and wherein the sub-pulse width power and position information is encoded in a look-up table that provides one output sub-pulse width power and position information for an input subject pel and surrounding pel pattern.

52. A system for reducing toner in an image comprised of raster pel data, comprising:

means for determining surrounding pels of subject pels;

means for generating, for each subject pel, a sub-pulse width power to charge a sub-pel region within the subject pel based on a pattern of the surrounding pels of the subject pel; and means for generating, for each subject pel, position information indicating an alignment of the sub-pel region in the pel, wherein the position information is used to position the sub-pel region produced by the sub-pulse width power in the pel and wherein the sub-pulse width power and position information is encoded in a look-up table that provides one output sub-pulse width power and position information for an input subject pel and surrounding pel pattern.

\* \* \* \* \*